United States Patent [19]

Takeishi

[11] Patent Number: 5,841,215
[45] Date of Patent: Nov. 24, 1998

[54] CONTROL APPARATUS FOR VIBRATION WAVE MOTOR

[75] Inventor: Hiroaki Takeishi, Utsunomiya, Japan

[73] Assignee: Canon Kabushiki Kaisha, Tokyo, Japan

[21] Appl. No.: 962,889

[22] Filed: Nov. 12, 1997

Related U.S. Application Data

[63] Continuation of Ser. No. 526,410, Sep. 12, 1995, abandoned.

[30] Foreign Application Priority Data

Sep. 14, 1994 [JP] Japan .................................. 6-220044

[51] Int. Cl.$^6$ ...................................................... H02N 2/00
[52] U.S. Cl. ........................................... 310/316; 310/317
[58] Field of Search ..................................... 310/316, 317

[56] References Cited

U.S. PATENT DOCUMENTS

| | | | |
|---|---|---|---|
| 4,812,699 | 3/1989 | Ogawa et al. ........................... | 310/316 |
| 5,130,619 | 7/1992 | Izuno ....................................... | 318/116 |
| 5,155,418 | 10/1992 | Kataoka .................................. | 318/116 |
| 5,214,339 | 5/1993 | Naito ....................................... | 310/316 |
| 5,459,369 | 10/1995 | Mitarai et al. .......................... | 310/317 |

FOREIGN PATENT DOCUMENTS

| | | | |
|---|---|---|---|
| 0442469 | 8/1991 | European Pat. Off. ......... | H02N 2/00 |
| 4341073 | 6/1995 | Germany .......................... | H02N 2/00 |
| 62-85685 | 4/1987 | Japan ............................... | H02N 2/00 |
| 62-237584 | 8/1994 | Japan ............................... | H02N 2/00 |

OTHER PUBLICATIONS

European Search Report dated Sep. 15, 1997.

*Primary Examiner*—Thomas M. Dougherty
*Attorney, Agent, or Firm*—Fitzpatrick, Cella, Harper & Scinto

[57] ABSTRACT

A control apparatus for a vibration wave motor providing control with high precision and a wide dynamic range by switching the driving frequency signal from an amplitude variable control range to a frequency variable control range on the basis on an input value.

8 Claims, 5 Drawing Sheets

CONTROL APPARATUS FOR VIBRATION WAVE MOTOR

This application is a continuation of Application Ser. No. 08/526,410 filed Sep. 12, 1995, now abandoned.

BACKGROUND OF THE INVENTION

1. Field of the Invention

The present invention relates to a control apparatus for a vibration wave driving device (vibration driving device) such as a travelling wave motor and, more particularly, to a vibration wave driving device which can be suitably applied to a field that requires high-precision alignment.

2. Related Background Art

A travelling wave motor as a typical one of vibration wave driving devices, for example, has the following basic arrangement. That is, the motor is constituted by a vibration member and a movable member. The vibration member is prepared by fixing two groups of piezo-electric elements, which are subjected to polarization, to a vibration elastic member formed in an annular shape, and forms a travelling wave by synthesizing two standing waves excited by applying AC voltages with different phases to the two groups of piezo-electric elements. The movable member is in press contact with the travelling wave forming surface of the vibration member, and is driven by the frictional force with the travelling wave forming surface.

Since the travelling wave motor with the above arrangement has characteristics, i.e., good stability at a low rotational speed and a high output torque, it has a feature of directly driving a member to be driven without using deceleration means such as a gear mechanism. Since the travelling wave motor performs frictional driving, no electromagnetic noise or the like is generated. In addition, since the travelling wave motor has a large holding torque and activation torque, it can realize high-precision alignment at high speed.

FIG. 4 shows a prior art schematic for driving this travelling wave motor. A function generator 4 outputs two phase signals of a frequency corresponding to an input frequency command value. The two phase signals are amplified to a predetermined level by an electrical power amplifier 5, and are applied to a travelling wave motor 6. The frequency, i.e., the driving frequency of the signals applied to the travelling wave motor, and the motor speed generally have the characteristics shown in FIG. 5. Therefore, by sweeping the driving frequency by utilizing relatively slow characteristics on the right side of a peak point in FIG. 5, the speed can be stably varied. As a typical prior art using this method, Japanese Laid-Open Patent Application No. 62-85685 is known.

FIG. 6 shows another prior art driving schematic. A command value which may have either a positive or negative sign is supplied to a function generator. An amplitude determination means determines the amplitude of an output signal on the basis of the absolute value of the command value, and a phase difference determination means 1 sets the phase difference between two phase output signals to be +90° or −90° depending on the sign of the command value. When the phase difference is switched in this manner, the rotation direction of the motor is automatically switched, thus realizing a continuous reversible operation. This method has already been proposed by the present applicant.

In the prior art, an analog circuit has been described for the sake of simplicity. However, to attain a simple circuit arrangement, a digital circuit arrangement may be adopted up to the power amplifier. In this case, a so-called pulse width modulation method for varying the amplitude of a signal to be applied to the motor depending on the pulse width is normally used.

In the first prior art system, a wide dynamic range is obtained by manipulating the driving frequency. This is due to the driving frequency-speed characteristics shown in FIG. 5; in other words, the resonance characteristics are utilized. However, since the characteristics have strong nonlinearity, as shown in FIG. 5, it is difficult to construct a servo system with a linear compensation element which has been popularly utilized. For this reason, it is difficult to attain adjustment in correspondence with the actual load, and this difficulty limits the application range of the travelling wave motor. In addition, another cause of the limited application range is an operation in only one direction is enabled by only manipulating the driving frequency.

In the second prior art system, since a continuous reversible operation can be realized by automatically manipulating the phase difference, the above-mentioned problems can be avoided to some extent. In particular, since the motor speed with respect to the amplitude of a signal to be applied to the travelling wave motor exhibits good linear characteristics, the motor can be easily handled as one element of a servo system, and can be suitably applied to, e.g., high-precision alignment. However, in this case, a wide dynamic range of the speed cannot be assured due to circuitry limitations such as saturation.

As described above, in the prior art system, it is difficult to use the travelling wave motor as an actuator with good linearity, which can assure both high precision and a wide dynamic range.

SUMMARY OF THE INVENTION

One aspect of the present invention is to provide a control apparatus for a vibration wave driving device capable of high-precision driving control and having a wide dynamic range.

One aspect of the present invention is to provide an apparatus which switches an amplitude control circuit and a frequency control circuit on the basis of an input value to achieve the above-mentioned objects.

Under the above objects, one aspect of the present invention is to provide a control apparatus for a vibration wave driving device, which apparatus outputs two-phase driving signals to driving electro-mechanical energy conversion elements in the vibration wave driving device for generating two-phase standing waves in an elastic member by applying two-phase driving signals to the driving electro-mechanical conversion element to excite an elliptic motion in surface particles of the driving surface of the elastic member. The apparatus comprises first compensation means for receiving an arbitrary real number value and determining a phase difference between the two-phase driving signals, second compensation means for determining an amplitude of the two-phase driving signals using the same input as the first compensation means, and third compensation means for outputting a frequency of the two-phase driving signals using the same input as the first and second compensation means, wherein the phase difference between the two-phase driving signals as an element for determining the driving direction, the amplitude of an element for compensating for activation, and the frequency as an element for determining the driving speed are set on the basis of a single input value, and the driving control of the vibration wave driving device such as a vibration wave motor can be appropriately executed in correspondence with a value according to these elements.

One aspect of the present invention is to provide a control apparatus in which the first compensation means outputs a value of one of +90° and −90° in correspondence with input information as a phase difference command to perform direction control.

Under the above objects, one aspect of the present invention is to provide an apparatus in which the second compensation means determines the absolute value of the input value as an amplitude command value and sets upper and lower limits of the amplitude command value, so that the amplitude command value can be output independently of the sign of the input value, and stable driving control is realized.

Under the above objects, one aspect of the present invention is to provide an apparatus in which, when the input value is smaller than the amplitude upper limit value set by the second compensation means, the upper limit value of the driving frequency is determined as a frequency command value, and when the input value is larger than the amplitude upper limit value set by the second compensation means, a value obtained by subtracting a monotone increasing function value having, as a variable, a difference between the absolute value of the input value and the amplitude upper limit value set by the second compensation means from a frequency upper limit value set by the third compensation means is output as the frequency command value, and a lower limit value is set for the frequency command value, so that even when the driving speed is frequency-controlled, the effective range of the phase manipulation variable amount can be widened, and a sufficiently wide dynamic range can be assured.

Under the above objects, one aspect of the present invention is to provide an apparatus which comprises fourth compensation means for generating the input value to the first, second, and third compensation means, and sets a value corresponding to the amplitude lower limit value in the second compensation means to be an initial value of a state amount of the fourth compensation means to set the amplitude lower limit value in the second compensation means for determining the amplitude, wherein a drawback that when speed compensator means comprises an integrator or the like, if the fourth compensation means initializes the integrator to zero, a predetermined period of time is required for charging up the integrator to a value corresponding to the lower limit value, and the alignment time is prolonged by the charge-up time in an application for performing alignment by very small pitch feeding, is eliminated by initializing the integrator to the lower limit value, thereby guaranteeing quick activation and alignment within a short period of time.

Other objects of the present invention will become apparent from the following description of the embodiments taken in conjunction with the accompanying drawings.

DESCRIPTION OF THE PREFERRED EMBODIMENTS INVENTION

Figure 1:
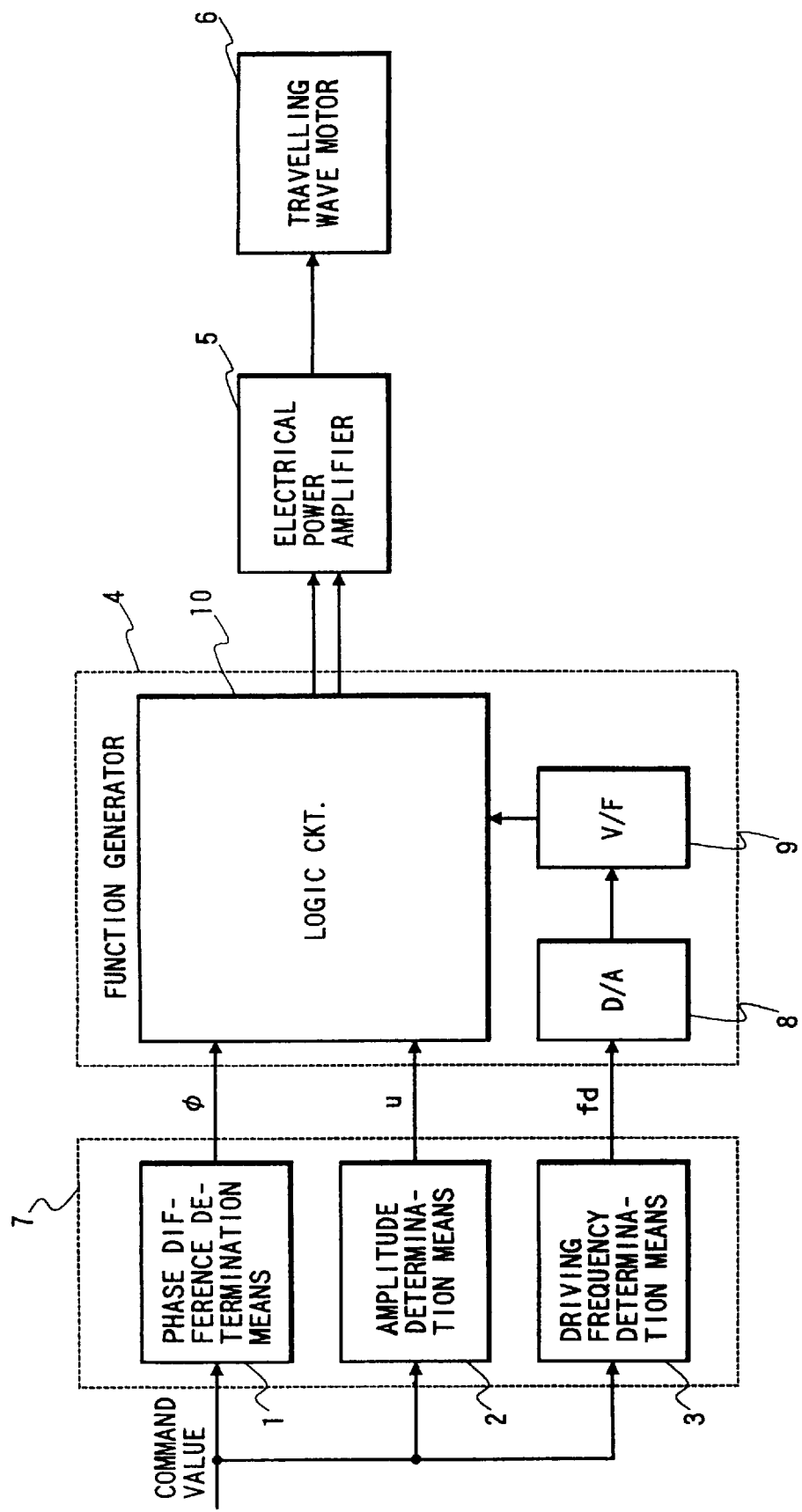
FIG. 1 is a block diagram showing the first embodiment of the present invention.

FIG. 1 shows the first embodiment according to the present invention. An apparatus shown in FIG. 1 comprises a first compensation element 1 as phase difference determination means, a second compensation element 2 as amplitude determination means, a third compensation element 3 as driving frequency determination means, a function generator 4, an electrical power amplifier 5, and a travelling wave motor 6. Note that the motor comprises a vibration wave motor constituted by a first electro-mechanical energy conversion element group $PZT_1$ consisting of a plurality of piezo-electric elements arranged on a vibration member, and a second electro-mechanical energy conversion element group $PZT_2$ consisting of a plurality of piezo-electric elements. The first, second, and third compensation elements are realized on a CPU 7 in a software manner. The function generator 4 comprises a D/A converter 8, a V/F converter 9, and a logic circuit 10 mainly constituted by a counter. The output from the driving frequency determination means 3 constituting the third compensation element is supplied to the D/A converter 8, and the V/F converter 9 generates a frequency signal serving as a reference for the driving signal. The logic circuit 10 determines the frequency on the basis of the reference signal, and generates two-phase pulse signals having a duty ratio proportional to an amplitude command value. The phase difference between these pulse signals is determined based on the output from the phase difference determination means 1 constituting the first compensation element. The electrical power amplifier 5 is constituted by a switching element and a booster inductance.

Figure 7A:
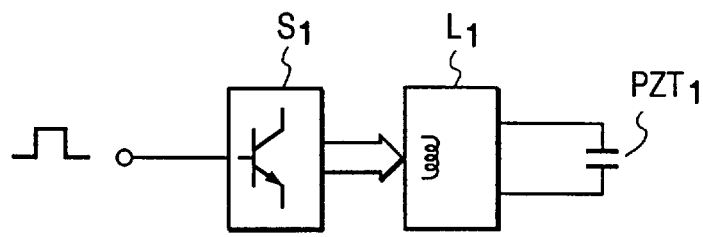
FIGS. 7A and 7B are circuit diagrams showing the arrangement of an electrical power amplifier shown in FIG. 1.
Figure 7B:
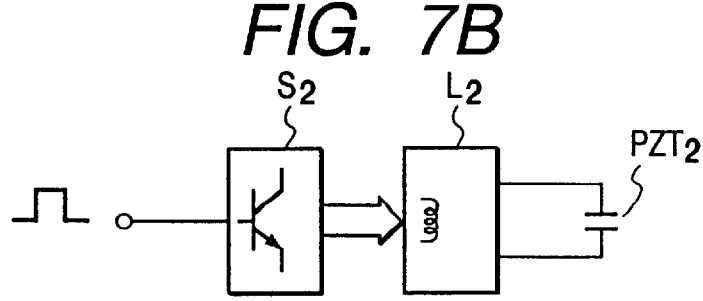

More specifically, as shown in FIGS. 7A and 7B the electrical power amplifier 5 comprises a switching circuit $S_1$ which receives the pulse signal, and alternately switches the direction of a current to be supplied to a booster coil $L_1$, and applies a frequency voltage, which has an amplitude corresponding to the duty ratio of the input pulse and the frequency of the input pulse (the frequency is determined by the frequency determination means), to the first electro-mechanical energy conversion element group $PZT_1$. A switching circuit $S_2$ and a booster coil $L_2$ are used for the second electro-mechanical energy conversion element group $PZT_2$. The phase difference between the pulse signals input to the switching circuits $S_1$ and $S_2$ is determined by the above-mentioned phase determination means.

In this embodiment, a command value to the travelling wave motor is given as a digital value which assumes an arbitrary value. Alternatively, an analog voltage may be A/D-converted, and the obtained digital value may be given. The command value is input to the first, second, and third compensation elements 1, 2, and 3.

The first compensation element 1 outputs a value of +90° or −90° as a phase difference command value in correspondence with the sign of the input command value. Let U be the command value and φ be the phase difference command value. Then, the function of the first compensation element can be described as follows:

$U \geq 0 \rightarrow \phi = 90°$ $U < 0 \rightarrow \phi = -90°$

Figure 5:
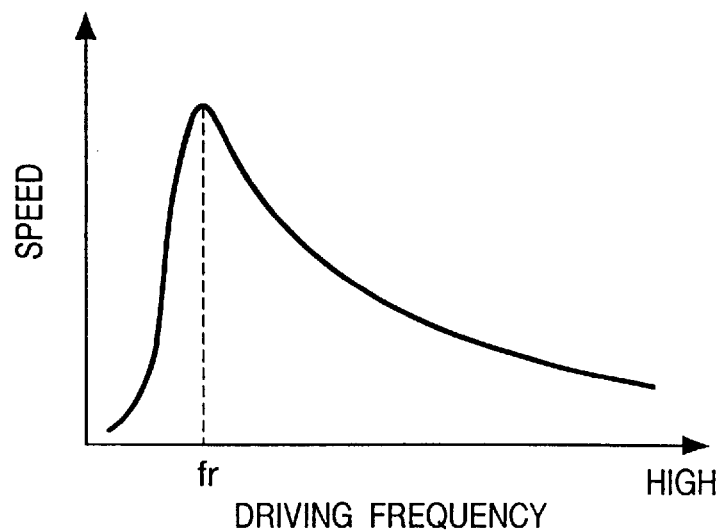
FIG. 5 is a graph showing frequency-speed characteristics.

The second compensation element 2 calculates the absolute value of the command value U, and outputs it as an amplitude command value. At this time, the element 2 sets upper and lower limit values for the amplitude command value to be output. The upper limit value is defined by the circuitry limitations in the function generator 4 and the electrical power amplifier 5 in the following stage. The reason why the lower limit value is set is to supply electrical power high enough to assure stable driving of the travelling wave motor. Let $u_{max}$ and $u_{min}$ be these upper and lower limit values, and u be the amplitude value. Then, the function of the second compensation element 2 can be described as follows:

$|U| < u_{min} \rightarrow u = u_{min}$ $|U| \geq u_{max} \rightarrow u = u_{max}$ $u_{min} \leq |U| < u_{max} \rightarrow u = |U|$ Furthermore, the third compensation element 3 outputs a driving frequency command value $f_d$ in accordance with the following formulas:

$|U| < u_{max} \rightarrow f_d = f_{max}$ $|U| \geq u_{max} \rightarrow f_d = f_{max} - k \cdot (|U| - u_{max})$ $f_{max} - k \cdot (|U| - u_{max}) \leq f_{min} \rightarrow f_d = f_{min}$ Note that the driving frequency upper limit value $f_{max}$ is set to be sufficiently higher than the resonance frequency, $f_r$, in FIG. 5, and the driving frequency lower limit value $f_{min}$ is set to be slightly higher than the resonance frequency $f_r$. The dynamic range of speed can be widened in correspondence with the difference between these upper and lower limit values. In the above formulas, the rate of change of speed with respect to amplitude is matched with the rate of change of speed with respect to driving frequency using a constant k. A range corresponding to any excess, above the amplitude upper limit value, of the absolute value of the amplitude U is assigned to manipulation of the driving frequency. In this manner, the effective range of the manipulation variable U is widened to assure a sufficiently wide dynamic range.

Figure 2:
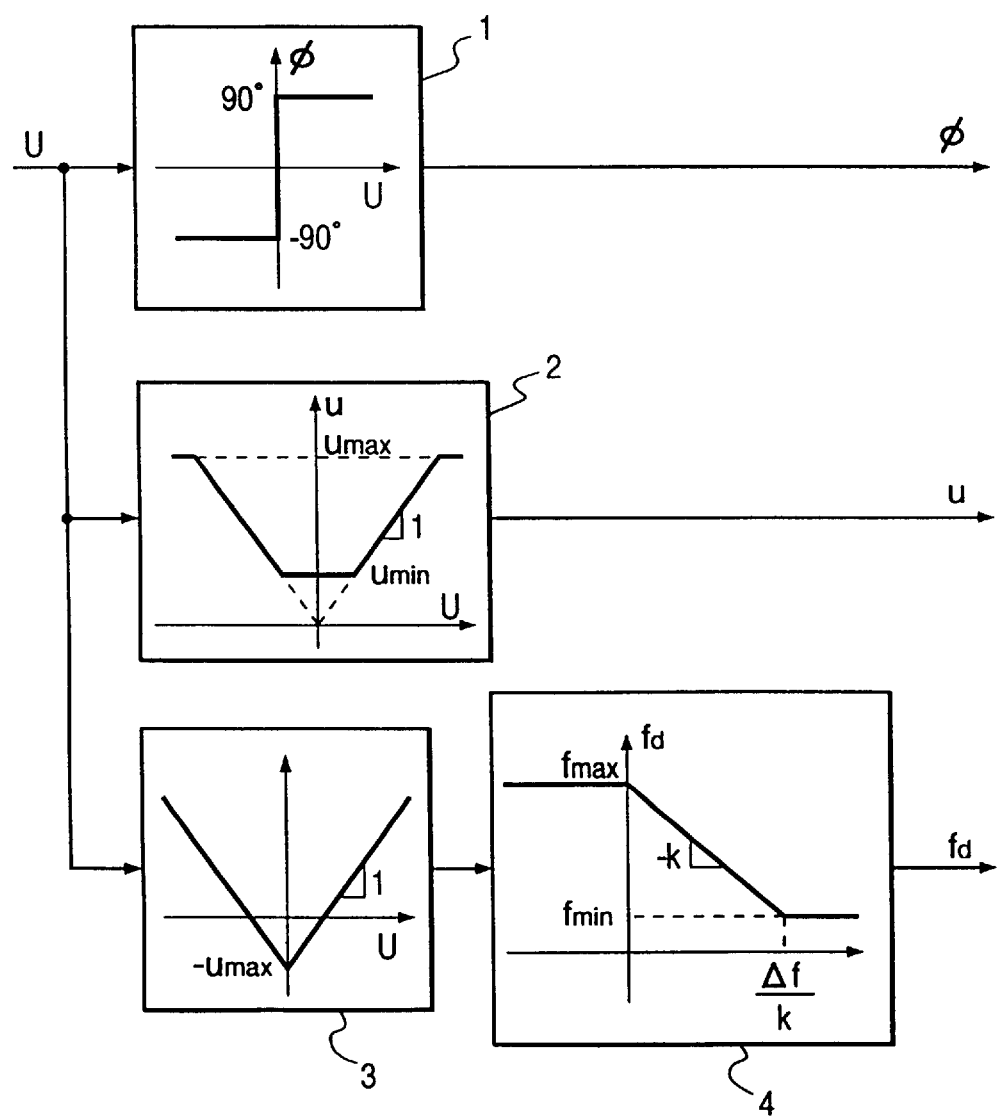
FIG. 2 is a view showing the detailed arrangement of a principal art of FIG. 1 in the form of output waveforms.

FIG. 2 illustrates the functions of the above-mentioned three compensation elements. By arranging the first, second, and third elements, the phase difference, amplitude, and driving frequency can be uniquely determined to match each other on the basis of the single linear manipulation variable U, and the speed of the travelling wave motor can have substantially linear characteristics with respect to the linear manipulation variable U. Therefore, a control compensation arithmetic operation result which is often used for determining the manipulation variable U can be directly used, and a travelling wave motor control apparatus which can perform adjustment in correspondence with the load can be provided.

Figure 3:
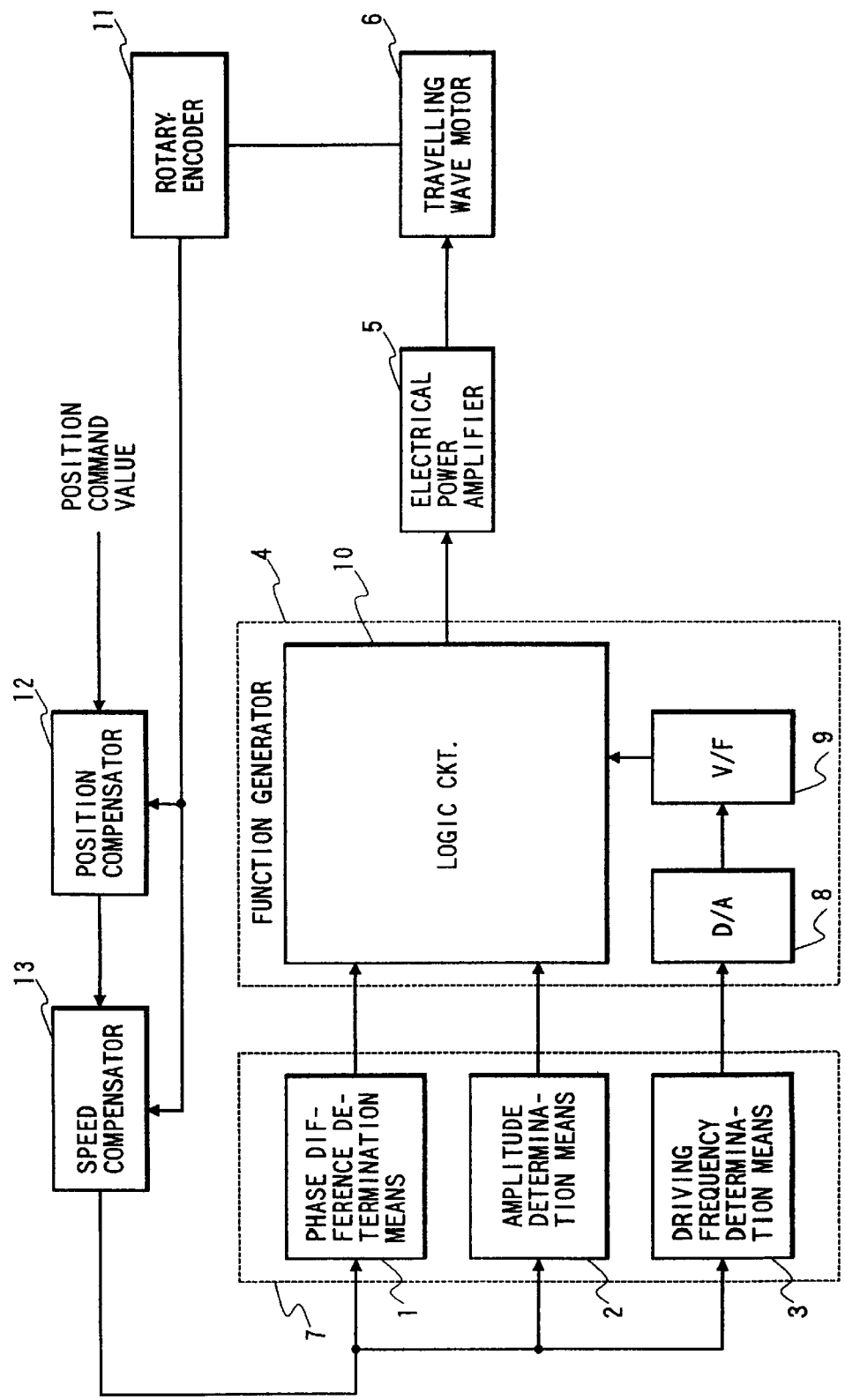
FIG. 3 is a block diagram showing the second embodiment of the present invention.
Figure 4:
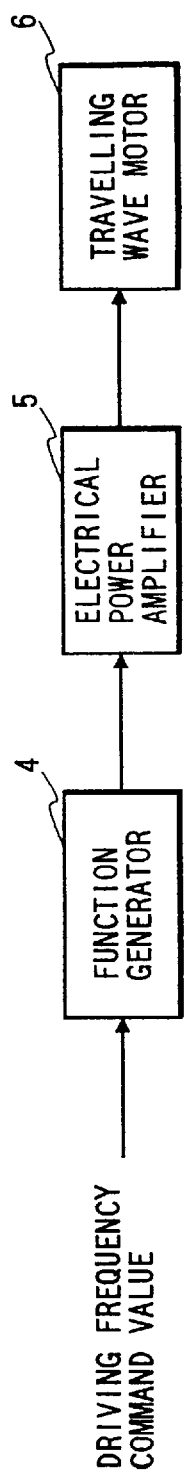
FIG. 4 is a block diagram showing a conventional control apparatus for a vibration wave motor.
Figure 6:
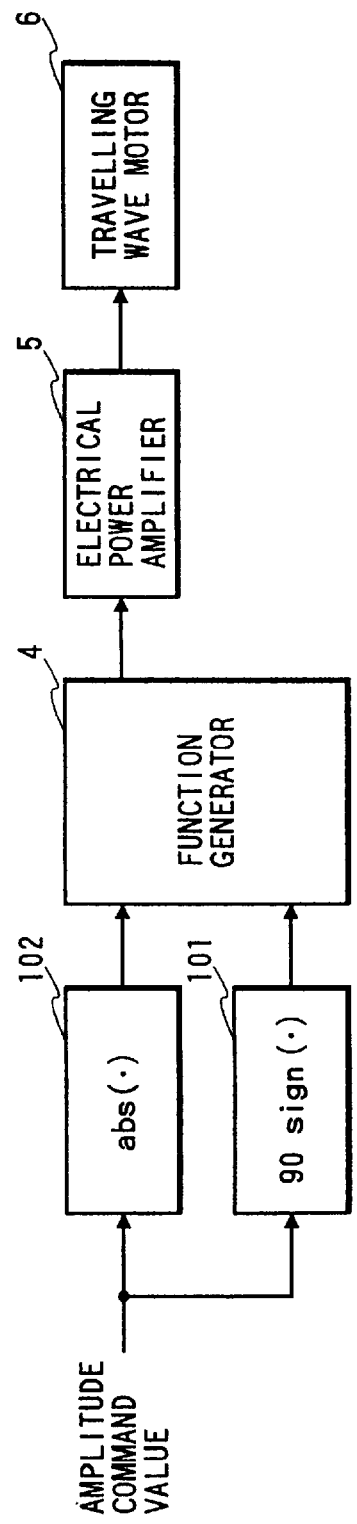
FIG. 6 is a block diagram showing another conventional control apparatus for a vibration wave motor.

FIG. 3 shows the second embodiment of the present invention. In this embodiment, the control apparatus is used for the purpose of alignment of a travelling wave motor. A rotary encoder 11 is coupled to the travelling wave motor with a sufficient rigidity. Thus, this embodiment constitutes a control system having a position feedback loop for calculating the difference between position information obtained using the rotary encoder and a target value, and a speed feedback loop for improving damping performance. A position compensator 12 uses a proportional element, and a speed compensator 13 uses a proportional+integral element. These compensation elements are also realized on the CPU 7 in a software manner.

It is a common practice to initialize the value of an integrator in the proportional+integral element 13 as the speed compensator to zero at the beginning of alignment. However, as has been described in the first embodiment, since the lower limit value is set in the amplitude determination means 2, when the value of the integrator is initialized to zero, a predetermined period of time is required until the integrator is charged up to a value corresponding to the lower limit value. In particular, in an application for performing alignment by very small pitch feeding, the alignment time is prolonged by the charge-up time.

In order to prevent this, in this embodiment, the value of the integrator is initialized to a value corresponding to the amplitude lower limit value immediately before the alignment operation is started. Since the sign of the value of the integrator differs depending on the operation direction of the travelling wave motor, the CPU 7 calculates the difference between the current position and a target position immediately before the beginning of alignment, and initializes the integrator so that the sign of the difference matches that of the initial value of the integrator. In this manner, the travelling wave motor can be quickly activated, and alignment can be attained within a short period of time.

In the first and second embodiments, in the driving frequency determination means 3, the rate of change of speed with respect to amplitude is matched with the rate of change of speed with respect to the driving frequency using a proportionality constant k. Instead, an arbitrary monotone increasing function may be used.

In particular, if the same function as that of the driving frequency-speed characteristics shown in FIG. 5 is used as the monotone increasing function, the speed of the travelling wave motor has a perfectly proportional relationship with the linear manipulation variable U, thereby improving the characteristics of the system. The function value may be stored in a ROM in the form of a table, and this table may be looked up.

In each of the above embodiments, a vibration wave motor which uses a vibration member obtained by joining piezo-electric elements to an annular elastic member and drives a member, which is in press contact with the elastic member, as a movable member, has been exemplified. Alternatively, the present invention may be applied to a system in which the member is fixed in position, and the vibration member is moved, or a sheet convey device in which the vibration member is fixed in position, and a sheet member such as a paper sheet which contacts the driving surface of the vibration member is moved.

Furthermore, the present invention may also be applied to a system wherein the vibration member is formed into a rod shape, flexural vibrations are excited in two axes perpendicular to the axial direction, and an elliptic motion is formed in the surface particles of a driving portion (e.g., one end portion of the vibration member) about an axis perpendicular to the axis direction by synthesizing the vibrations, thereby moving a member which is in press contact with the driving portion relative to the rod-shaped vibration member.

What is claimed is:

1. A control apparatus for a vibration wave driving device, which apparatus outputs two-phase driving signals to driving electro-mechanical energy conversion elements in the vibration wave driving device for generating two-phase standing waves in an elastic member by applying two-phase driving signals to the driving electro-mechanical energy conversion elements, and exciting an elliptic motion in surface particles of a driving surface of the elastic member, comprising:

(a) first compensation means for receiving an arbitrary real number value as an input, and determining a phase difference between the two-phase driving signals;

(b) second compensation means for receiving the same real number value as the real number value inputted to said first compensation means, and determining an amplitude of the two-phase driving signals; and (c) third compensation means for receiving the same real number value as the real number value inputted to said first and second compensation means, and determining a frequency of the two-phase driving signals.

2. An apparatus according to claim 1, wherein said first compensation means outputs a value of one of +90° and −90° as a phase difference command value in correspondence with input information.

3. An apparatus according to claim 1, wherein said second compensation means determines an absolute value of the input value as an amplitude command value, and upper and lower limits for the amplitude command values are set.

4. An apparatus according to claim 1, wherein when the input value is smaller than the amplitude upper limit value set by said second compensation means, said third compensation means determines an upper limit value of the driving frequency as a frequency command value, and when the input value is larger than the amplitude upper limit value set by said second compensation means, said third compensation means outputs, as a frequency command value, a value obtained by subtracting a monotone increasing function value having, as a variable, a difference between the absolute value of the input value and the amplitude upper limit value set by said second compensation means from the frequency upper limit value, and said third compensation means sets a lower limit value for the frequency command value.

5. An apparatus according to claim 1, further comprising fourth compensation means for generating an input value to be inputted to said first, second, and third compensation means, and wherein a value corresponding to the amplitude lower limit value in said second compensation means is set to be an initial value of a state amount of said fourth compensation means.

6. A vibration motor apparatus which obtains a driving force by vibrating a vibration member by applying frequency signals having different phases to first and second electro-mechanical energy conversion element portions provided to the vibration member, comprising:

input information setting means for setting an input information value;

frequency setting means for setting a frequency to be a first frequency when input information from said input information setting means has a value within a first range, and for setting the frequency to be a value in correspondence with the input information value when the input information is a value within a second range;

amplitude setting means for setting an amplitude to be a value in correspondence with the input information value when the input information from said input information setting means is a value within a first range, and for setting the amplitude to be a predetermined value when the input information is a value within a second range; and control means for controlling a frequency and an amplitude of the frequency signals using said frequency setting means and said amplitude setting means.

7. An apparatus according to claim 6, wherein when the input information falls within a range from a first value to a second value, said frequency setting means sets the frequency to be the first frequency, when the input information is larger than the second value, said frequency setting means sets the frequency to be a value between the first frequency and a frequency value lower than the first frequency in correspondence with the input information, and said amplitude setting means gradually increases the amplitude to the predetermined value as the input information changes from the first value to the second value.

8. An apparatus according to claim 7, wherein said control means forms the frequency signals by receiving pulse signals, a frequency of the pulse signals is set by said frequency setting means, and a duty ratio of the pulse signals is set by said amplitude setting means.

* * * * *

UNITED STATES PATENT AND TRADEMARK OFFICE
CERTIFICATE OF CORRECTION

PATENT NO. : 5,841,215

DATED : November 24, 1998

INVENTOR(S) : HIROAKI TAKEISHI

It is certified that error appears in the above-identified patent and that said Letters Patent is hereby corrected as shown below:

<u>Column 2</u>

Line 30, "system." should read --systems,--.

Signed and Sealed this

Sixth Day of July, 1999

Attest:

Attesting Officer

Q. TODD DICKINSON

Acting Commissioner of Patents and Trademarks